United States Patent

[11] 3,596,191

| [72] | Inventor | Paul E. Stuckert<br>Katonah, N.Y. |
|---|---|---|
| [21] | Appl. No | 837,789 |
| [22] | Filed | June 30, 1969 |
| [45] | Patented | July 27, 1971 |
| [73] | Assignee | International Business Machines<br>Corporation<br>Armonk, N.Y. |

[54] SAMPLING CIRCUIT
7 Claims, 3 Drawing Figs.

[52] U.S. Cl............................................ 328/151,
307/238, 307/257, 328/208
[51] Int. Cl....................................................... H04b 1/04
[50] Field of Search............................................ 328/151;
307/257, 238

[56] References Cited
UNITED STATES PATENTS

| 3,327,219 | 6/1967 | Cunningham................ | 328/151 X |
| 3,333,110 | 7/1967 | Schanne...................... | 307/257 X |
| 3,484,689 | 12/1969 | Kerns............................ | 328/151 X |

Primary Examiner—Donald D. Forrer
Assistant Examiner—B. P. Davis
Attorneys—Hanifin and Jancin, Frank Chadurjian and Victor Siber ABSTRACT: A sequential gate sampling circuit is shown as used in a sampling oscilloscope. Sampling is achieved by sequentially actuating two gates from a common source of strobe pulses. Prior to the initiation of a sampling operation, a first of the gates is quiescently closed and a second of the gates is quiescently open. At the beginning of a sampling operation, a pair of strobe pulses rise very quickly and divide along transmission lines of unequal length, switching the first gate to the open state and subsequently switching the second gate to the closed state. The sampling time duration is created by the difference in time between the opening of the first bridge and the closing of the second bridge. This time duration is controlled by the difference in length of the transmission lines allowing operation of the gates during the onset of the strobe pulses.

INVENTOR
PAUL E. STUCKERT

SAMPLING CIRCUIT

BACKGROUND OF THE INVENTION

The present invention relates to a sampling circuit which may be used in a sampling oscilloscope or other data acquisition or display equipment. More particularly, it relates to a sampling circuit with an improved sampling aperture duration which is neither limited nor determined by the width of strobe pulses that drive the sampling circuit.

The sampling oscilloscope is a device which is capable of displaying signals which exceed the normal gain bandwidth limitation of the amplifiers of an ordinary real time oscilloscope. In the current state of the art in circuit design, components produce signals of a fractional nanosecond time period. Signal levels of this short time duration are not capable of being displayed on the ordinary oscilloscope due to the limited gain bandwidth of the amplifying circuits. Therefore, the technology has developed an oscilloscope which operates on a sampling system principle. The sampling technique consists of gating portions of an input signal or waveform to be displayed on a periodic basis. The duration of the gating or sampling is relatively small in comparison to the period of the input waveform. Following this gating of the signal, a reconstruction of the actual signal is achieved by displaying a series of the instantaneous amplitudes that were detected during each gating period. The displayed signal then appears to look like the actual signal even though it is in a reconstructed form.

In this type of system, the pulse sample amplitudes and not the actual signal are displayed on the CRT of the oscilloscope. What is shown on the screen consists of a large number of spots which appears as a continuous signal because of the persistence of the CRT screen.

Another feature that is sometime utilized in state of the art oscilloscopes is a memory circuit. This device eliminates the need for the trace signal to return to zero after each sample. The memory circuit, in combination with the amplifier, adjust a feedback signal which is dependent on the previous amplitude that was sampled.

A limiting factor in sampling systems is the minimum duration to which the sampling aperture duration may be reduced. Clearly the smaller the sampling aperture duration, the greater the effective bandwidth of the sampling oscilloscope, the greater the number of samples per unit time possible. In the current state of the art sampling circuits, sampling is achieved by means of a sampling gate which is first cycled open and then closed within a time interval which is determined by the width of interrogate or strobe pulses. The gate is quiescently in a closed condition and is made to open on the rise of a pair of simultaneously applied interrogate pulses and is then made to close on the fall of the pulses. Due to the dependency of such circuits on both the rise and fall of the interrogate pulses and the necessity of some time duration between the rise and fall of such pulses, sampling aperture time is limited regardless of any optimum speed of component circuitry.

It is therefore a primary object of the present invention to reduce the sampling aperture time of a sampling circuit beyond that obtainable by prior art circuits.

Another object of the present invention is to provide a sampling circuit whose sampling aperture time is independent of the width of the interrogate or strobe pulses.

Another object of the present invention is to control the beginning of the sampling aperture period by a different pulse that than which controls the termination of the sampling aperture period.

It is a further object of the present invention to provide a circuit with a sampling aperture which is adjustable by varying the length of transmission lines.

The foregoing and other objects, features and advantages of the invention will be apparent from the following more particular description of a preferred embodiment of the invention, as illustrated in the accompanying drawings.

Briefly, the disclosed embodiment samples an input signal for a time duration dependent on the time difference between the application of two pairs of strobe pulses to control a first and second gate circuit. Sampling is effected by passing the input signal through two gates connected in serial fashion. The first gate is quiescently in a closed condition and is made to conduct or be placed in an open condition by means of a first pair of strobe pulses. Activation of this first gate permits passage of the input signal at the time of gating. At this time, the second gate is quiescently in an open condition so as to pass the output of the first gate. The second gate is then switched by means of a second pair of strobe pulses to a closed condition so as to terminate the sampling operation. The difference in time between application of the first and second pair of strobe pulses is controlled by the difference of lengths of transmission lines which transmit the same strobe signals to the first and second balanced gates respectively. Since each gate performs only one function which effects the sampling aperture time, that is, turning open or turning closed, the sampling time is independent of the strobe pulse width. Therefore, each of the gates may be designed to have an optimum response in only one direction of operation, depending on its function during the sampling operation. This permits use of strobe pulses which have very fast rise times and relatively long durations, exponential or other fall times.

PRIOR ART

Figure 1:
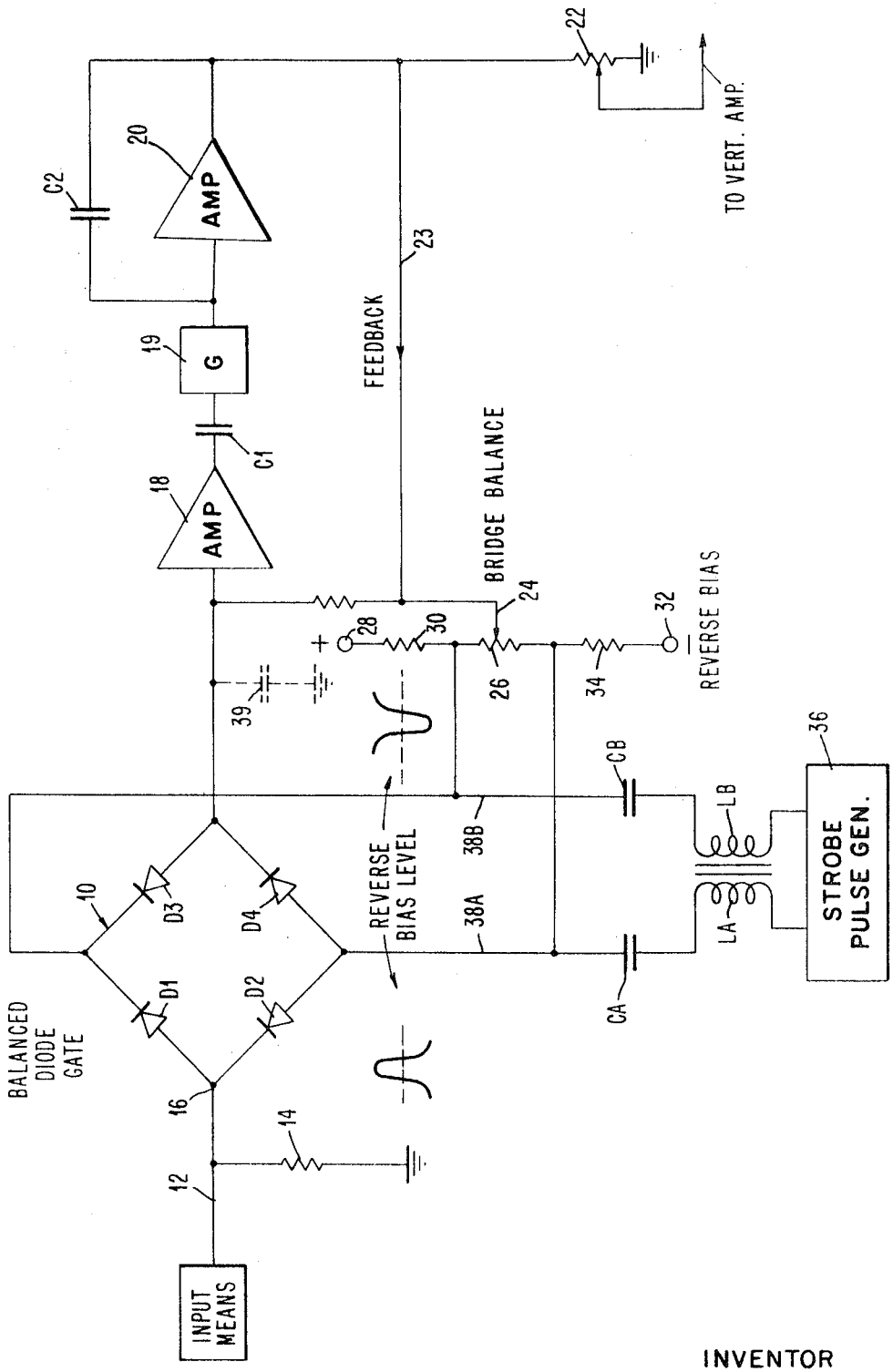
FIG. 1 is a schematic representation of a prior art sampling system.

Referring to FIG. 1, there is shown a schematic diagram of a sampling system representative of the prior art as generally shown and described in a publication entitled "Sampling Notes," published by Tektronix, Inc., Copyright 1964. In this figure, there is shown a sampling circuit which utilizes a balanced diode gate 10, made up of diodes D1—D4, which is switched open and then switched closed to allow passage of an input signal for the small period of time that the gate is open. In the operation of this circuit, an input signal or waveform which is to be sampled is introduced by means of an input line 12 connected in parallel to a terminating resistor 14. The resistor 14 is grounded on one side and has its other side connected to a terminal 16 which is the classical input terminal to the balanced diode gate 10. The output of gate 10 is connected to an amplifier 18 which in turn has its output connected; through a capacitor C1, an output gate 19 in series with a parallel combination of a capacitor C2 and a second amplifier 20 which together comprise a memory circuit; to ground through a resistor 22 and, via a feedback line 23, to a variable contact 24 which is in contact with a resistor 26. One side of resistor 26 is connected to a positive bias source at terminal 28 through a resistor 30 and is also connected to one side of the diode bridge gate 10. The other side of resistor 26 is connected to a negative bias source at terminal 32 through a resistor 34 and is also connected to an opposite side of the diode bridge gate 10. A strobe or interrogate pulse generator 36 is connected to opposite sides of the gate 10 through a balancing transformer having windings LA and LB connected in series with capacitors CA and CB, respectively.

The quiescent state of the balanced diode gate 10 is in a closed condition so that the signal which appears at input line 12 is not passed through gate 10 to the amplifier 18 until the balanced diode gate 10 is switched to an open condition by signals from the strobe or interrogate pulse generator 36. At the initiation of sampling time, pulse generator 36 sends out strobe or interrogate pulses of very narrow duration along lines 38A and 38B. The sampling bridge 10 is quiescently held by the applied reverse bias in the closed condition by means of bias potentials applied at 28 and 32. The strobe pulses are sufficiently large to overcome this quiescent bias and drive diodes D1—D4 into conduction so that the input signal is propagated through gate 10 to the amplifier 18. The diodes remain in an on condition for the duration of the strobe pulses, and are returned to an off condition by the trailing edge of the strobe pulses. A capacitance 39, typically a stray capacitance, captures a voltage which is proportional to the input voltage at terminal 16 when the gate 10 changes states. In the sampling oscilloscope application the amplitude of the input signal which is conducted to amplifier 18 is then passed through amplification and feedback circuitry as above described, and is eventually represented by an intensified dot on the oscilloscope screen. This process is continued repetitively so as to reconstruct the entire input signal. In other data acquisition applications the output of gate 10 may be delivered to circuitry other than the amplifier 18 and the memory made up of C2 and amplifier 20.

DETAILED DESCRIPTION OF THE INVENTION

Figure 2:
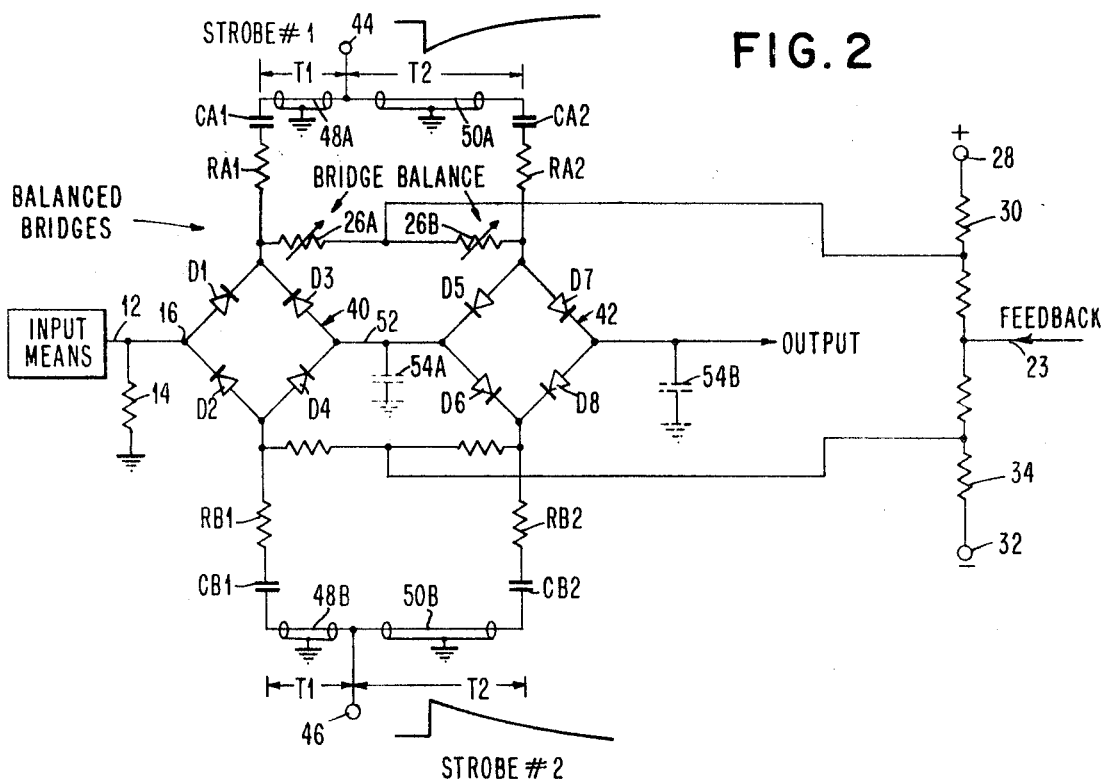
FIG. 2 is a schematic representation of the improved sampling circuit.
Figure 3:
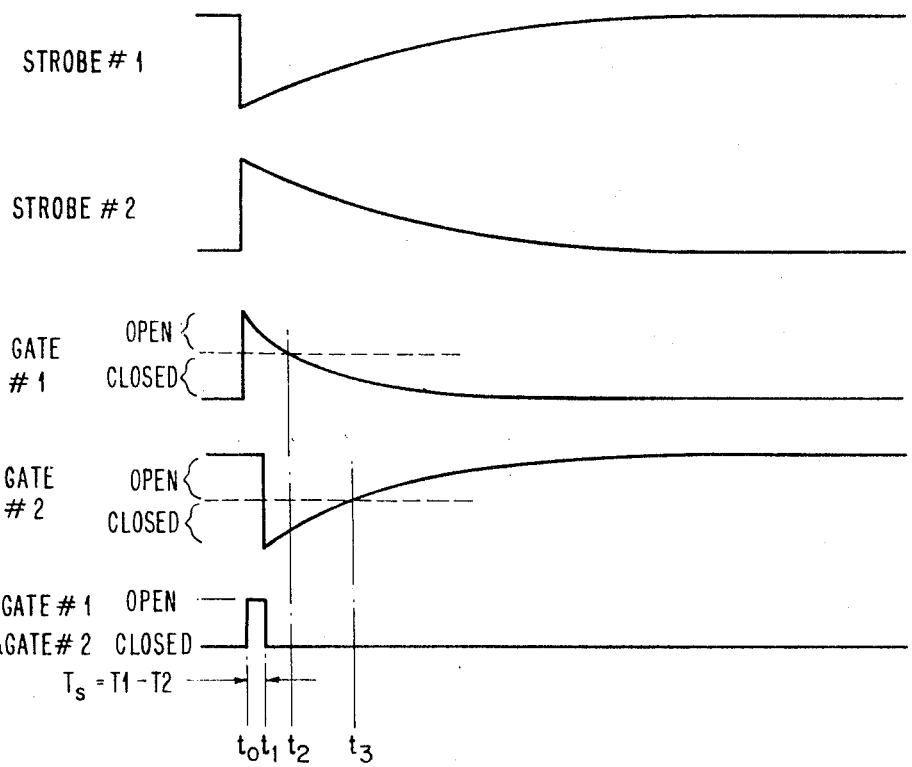
FIG. 3 shows the waveforms of the strobe pulses that actuate and control the improved sampling circuit.

The invention will now be described with reference to FIGS. 2 and 3. The circuit diagram disclosed in FIG. 2 represents the invention which consists of an improvement to the gating circuitry shown in FIG. 1. The entire circuit of FIG. 2, other than the input line 2, its terminating resistor 14 and the bias 28 and 32 and feedback line 23, would be substituted for the single gate circuitry that has been utilized in the prior art. Also, the interrogate or strobe pulse generator 36 and the balancing transformer having windings LA and LB of FIG. 1 would be replaced by a pulse generator capable of producing very short rise time pulses which have convenient exponential fall times such as indicated by the pair of pulses labeled strobe 01 and strobe 02 in both FIGS. 2 and 3.

The sampling circuit of FIG. 2 consists of a first and second gate means shown as two balanced diode gates 40 and 42 having diodes D1—D4 and D5—D8, respectively. Gate 40 is biased quiescently in a closed condition by maintaining its diodes in a reverse bias state via the potentials applied at points 28 and 32. Here, since two diode gates are employed, two variable resistances 26A and 26B for individually balancing the diode bridge gates 40 and 42 are employed. At the time that sampling is to be initiated, strobe pulses 01 and 02 of FIG. 3 are introduced into opposite sides of the sampling circuit at terminals 44 and 46. Both strobe pulses come from a common source and, as shown in FIG. 3, begin at the same time $t_0$ but are of opposite polarities.

Transmission of the strobe or interrogate pulses from terminals 44 and 46 to gate 40 is effected through transmission lines 48A and 48B of electrical length T1, capacitors CA1 and CB1 and resistors RA1 and RB1; while transmission of the strobe or interrogate pulses from terminals 44 and 46 to gate 42 is effected through transmission lines 50A and 50B of electrical length T2, capacitors CA2 and CB2 and resistors RA2 and RB2.

As shown in the circuit diagram of FIG. 2, the length of transmission line T2 is greater than T1 and will accordingly introduce a larger delay in the transmission of the strobe pulses. Thus, the strobe pulses will reach gate 40 prior to reaching gate 42. This difference in time may be represented as $T_s=T2-T1$ which indicates the time delay difference between the two pairs of cable lengths. At time $t_0$ strobes 01 and 02 propagate through capacitors CA1 and CB1 to bias the diodes D1—D4 and switch the bridge 40 to a conducting state thereby turning it to an open condition. When this occurs, the signal present at input 12 is conducted, via line 52 to gate 42. A short time later at $t_1$, strobes 01 and 02 propagate through capacitors CA2 and CB2 and effectively reverse bias the diodes D5—D8 of gate 42. This reverse biasing turns gate 42 to a closed condition thereby terminating the sampling operation. Thus, the effective sampling time is $T_s=T2-T1$ as indicated in FIG. 3.

During the time that the gates are changing from their quiescent state, a voltage which is proportional to the input voltage at terminal 16 is captured at capacitances 54A and 54B which are present at the output of gates 40 and 42 respectively. This voltage is indicative of the magnitude of the sampled input signal. In the oscilloscope application after amplification of the voltage captured by 54B, this voltage will be represented by a deflected dot on the CRT of the oscilloscope.

The signal which appears at the terminal 16 during the sampling aperture is passed from the output means of gate 42 on to the output terminal which may then be treated the same way as discussed with respect to the operation of the circuit of FIG. 1.

As indicated in the circuit diagram of FIG. 2, the sampling aperture time may be controlled by varying the electrical lengths of transmission lines 48 and 50. By varying these lengths, sampling apertures times are substantially improved (i.e., reduced) and are independent of the strobe pulse widths. Also, gates 40 and 42 may be designed so as to have fast opening and closing times, respectively, which are substantially independent of their operating times in the opposite directions. This allows an economy in the circuitry that is used since there is no compromise necessary to achieve fast operation of the gates in both directions.

The coupling capacitors CA1 and CB1 are of a smaller quantity than coupling capacitors CA2 and CB2 so that bridge 40 returns more quickly to its quiescent closed state at time $t_2$ while bridge 42 returns more slowly to its quiescent open state at time $t_3$. In the sampling oscilloscope application, after time $t_3$, the corrective feedback voltage to 23 provides the feedback input required in this mode of operation.

While it is noted that the disclosed embodiment shows a balanced four diode gate, it is recognized by those skilled in the art, that other gate circuits may be utilized. For example, it is possible to effect the same advantages of the disclosed circuit by using a two diode gate. Effectively, the gates may be substituted by any element capable of switching on or off at the rate of speed consistent with the desired sampling aperture time. Further, while it is assumed that the signal propagation through the gates is negligibly small, where this is found to be comparatively large under any particular embodiment for a desired sampling operation, this time may be compensated for by appropriate adjustments of the electrical lengths T1 and T2 of the transmission lines 48 and 50.

While the invention has been particularly shown and described with reference to the preferred embodiment thereof, it will be understood by those skilled in the art that various changes in form and details may be made therein without departing from the spirit and scope of the invention.

What I claim is:

1. In a circuit for sampling a waveform:
   a first and second gate means connected in tandem and each operative in a closed and open condition wherein said open condition prevents the passage of signals therethrough and said closed condition allows the passage of signals therethrough;
   means for quiescently biasing said first gate means in a normally closed condition and said second gate means in a normally open condition;
   generator means for generating strobe pulses; and
   control means connecting said generator means to said first and second gate means for sequentially operating both of said first and second gate means, in the order named, during the onset of said strobe pulses, the second gate means being operative prior to the restoration of the first means to its quiescent state and the operation of the sampling being independent of the width of said strobe pulses.

2. The circuit of claim 1, wherein said generator means generates pairs of simultaneous strobe pulses.

3. The circuit of claim 2, wherein said first and second gate means are sequentially operated during the onset of each pair of strobe pulses.

4. The circuit of claim 1, wherein said control means comprises a delay line means for delaying the application of said strobe pulses to said second gate means.

5. The circuit of claim 4, wherein said generator means generates pairs of simultaneous strobe pulses and said delay line means comprises a pair of transmission delay lines interconnected between said generator means and said second gate means.

6. The circuit of claim 5, wherein said control means comprises a further pair of transmission delay lines interconnected between said generator means and said first gate means.

7. The circuit of claim 6, wherein each said first and second gate means comprise a balanced diode bridge circuit.